United States Patent [19]

Inkmann et al.

[11] Patent Number: 4,460,054

[45] Date of Patent: Jul. 17, 1984

[54] METHOD AND APPARATUS FOR PORTION CONTROL

[76] Inventors: Mark S. Inkmann, 2808 N. 83rd, Milwaukee, Wis. 53222; Neil C. Karolek, 1506 N. Chicago Ave., South Milwaukee, Wis. 53172; John G. Reichard, N93 W15500 Hillside La., Menomonee Falls, Wis. 53051; Donald A. Inkmann, 10436 W. Rae Ave., Milwaukee, Wis. 53225

[21] Appl. No.: 381,835

[22] Filed: May 25, 1982

[51] Int. Cl.³ .................. G01G 19/56; G01G 23/10
[52] U.S. Cl. .................................. 177/149; 177/185; 177/1
[58] Field of Search ............... 177/148, 1, 149, 185

[56] References Cited

U.S. PATENT DOCUMENTS

| | | | |
|---|---|---|---|
| 94,974 | 9/1869 | Priest et al. | 177/149 |
| 784,641 | 3/1905 | Taylor | 177/149 |
| 2,497,271 | 2/1950 | Peckham | 177/149 |

Primary Examiner—George H. Miller, Jr.
Attorney, Agent, or Firm—Joseph J. Jochman, Jr.

[57] ABSTRACT

The manual portioning of non-uniform bulk products, such as the bagging of freshly prepared food products in fast-food restaurants, is controlled by a method and means which provide rapid and accurate individual portioning and consistently accurate feedback to the operator. Accurate real time weighing is provided quickly for every portion, and apparatus is disclosed to provide dynamic weighing such that no significant additional time is required for the portioning cycle. Since the feedback to the operator is based on true rather than estimated weight and is presented at the optimum time and location, the operator learns to portion the products accurately, as well as consistently.

10 Claims, 5 Drawing Figures

METHOD AND APPARATUS FOR PORTION CONTROL

BACKGROUND OF THE INVENTION

The present invention pertains to the art of weighing and, more particularly, to a weighing method, and apparatus useful in practicing the method, to provide improved portion control in the bagging or other dispensing of non-uniform bulk products.

It is well known in many businesses that, when bulk products are packaged or otherwise portioned for sale, care must be exercised to maintain proper weight or other measured control of each portion. The basic reasons for this are clear; over-portioning will result in a loss or reduction in profitability and under-portioning will result in customer dissatisfaction. The problem is more acute where the bulk products to be portioned are of non-uniform size or shape and must be manually portioned by an operator having little or no opportunity to weigh individual portions.

An example of a business where the problem is particularly difficult is found in the typical "fast food" restaurant where french fried potatoes are a standard menu item. French fries are of non-uniform size and/or shape and are typically dispensed in bags or similar containers filled by hand from a supply of randomly oriented pieces. Ideally, accurate portion control can be attained by weighing each portion. However, this is both tedious and time consuming and, in the typical fast food restaurant, a virtual impossibility.

Thus, the operator's ability to utilize portion control is based on some rather limited feedbacks, such as his estimations based on visual inspection, sensing the weight, the size of the container, or the capacity of the scoop or other device used to fill the containers. Such kinds of feedback may be used successfully to help an operator learn to portion somewhat more uniformly. Nevertheless, the lack of an accurate reference, such as actual measured weight of each or a significant number of portions, may well result in the ability to portion rapidly and uniformly, but inaccurately. In addition, the judgments made to establish portion sizes based largely on operator estimates are likely to vary among operators and, as a result, so will the portions. A simple expedient used to resolve this problem is to have operators intentionally overfill in order to avoid under-portioning and resultant customer complaints or dissatisfaction. The concomitant result is consistent decreased profit potential in the particular operation involved.

U.S. Pat. No. 3,255,570 discloses a method and apparatus for manually filling containers with non-uniform bulk products and, in particular, for bagging french fried potatoes. Among the objects of that invention is to provide a user with the means and method to rapidly and consistently bag french fries and the like with a unique scooping, orienting and filling device. Though quite effective and commercially successful, the use of this device still requires the operator to visually measure and estimate each portion collected for bagging. The feedback to the user may with time and experience provide the ability to make a fairly consistent determination of the quantity of items collected, but without an accurate reference against which to compare the estimated amounts, the portions are likely to be consistently high or low. To overcome this problem, the operator may be instructed to periodically check his estimates by actually weighing an estimated portion. Typically, this is done by filling a container or bag, removing it from the scoop and weighing it on a nearby platform scale. However, the largest volume of french fries is portioned and bagged for sale concurrently with the busiest periods, making check weighing by conventional methods very difficult if not impossible. As a result, the potentially beneficial effects of feedback to the operator may have to be largely discarded and resort made to the expedient of over-filling.

The prior art discloses scoops with built-in weighing devices, examples of which are shown in U.S. Pat. Nos. 94,974 and 2,497,271. These devices, however, are relatively simple, mechanically operated weighing devices having neither the accuracy not the response capability necessary for the rapid portioning discussed above.

It is also known to compensate for the effects of acceleration or vibration in scales of various types. Examples are disclosed in U.S. Pat. Nos. 2,767,974, 3,556,237, 3,670,833 and 4,212,361. All of the foregoing, however, disclose stationary weighing devices and none addresses any of the problems unique to hand held scoops utilized in the rapid portioning of bulk products.

SUMMARY OF THE INVENTION

It is a principal object of this invention to provide both apparatus and a method whereby the use of feedback to an operator is optimized by assuring that such feedback is accurate and representative of the true measure of the product being portioned. In accordance with the method, an intermediate step of weighing, while on the portioning device, the products being portioned is included in known portioning methods. By having the true weight of, for example, a portion of french fries on a bagging type scoop immediately and accurately available to the operator, this feedback can be utilized immediately by the operator to adjust an incorrect portion and to appropriately adjust succeeding portions, both resulting in better portion control.

To provide the fast and accurate measurement of weight needed to make the method suitable for use in the intended environment where rapid portioning is required, the apparatus of the present invention comprises a solid state electronic weighing scoop having means to compensate for or minimize the effects of acceleration. This allows a portion placed on the scoop for subsequent bagging to be dynamically weighed with little or no interruption in the usual portioning process. Acceleration compensation or minimization provides an accurate indication of the true weight of the portion even with the scoop in actual use, thereby obviating the need to halt or interrupt the process to check the weight.

The scoop of the present invention is constructed with the forward collecting section separate from the rear bagging section. The two sections are attached with a resilient connection which allows the collecting section to deflect with respect to the bagging section under the weight of products scooped by the operator. The relative movement between the two sections can be measured with a displacement transducer, such as a load cell, linear transformer, or the like, however, the effects of accelerative forces induced by scoop movement must be eliminated or reduced to acceptable levels in order to make the scoop truly useful as a dynamic weighing device. The effects of acceleration on the signal from the load cell or other weight detecting device may be electrically filtered, damped or clipped. Means are also disclosed to eliminate the inaccuracies resulting from tilting the scoop during weighing. Alternately, an accelerometer may be employed to directly measure the acceleration forces which are then electrically eliminated, leaving only the true static weight. The use of an accelerometer also compensates automatically for tilt.

DESCRIPTION OF THE PREFERRED EMBODIMENT

Figure 1:
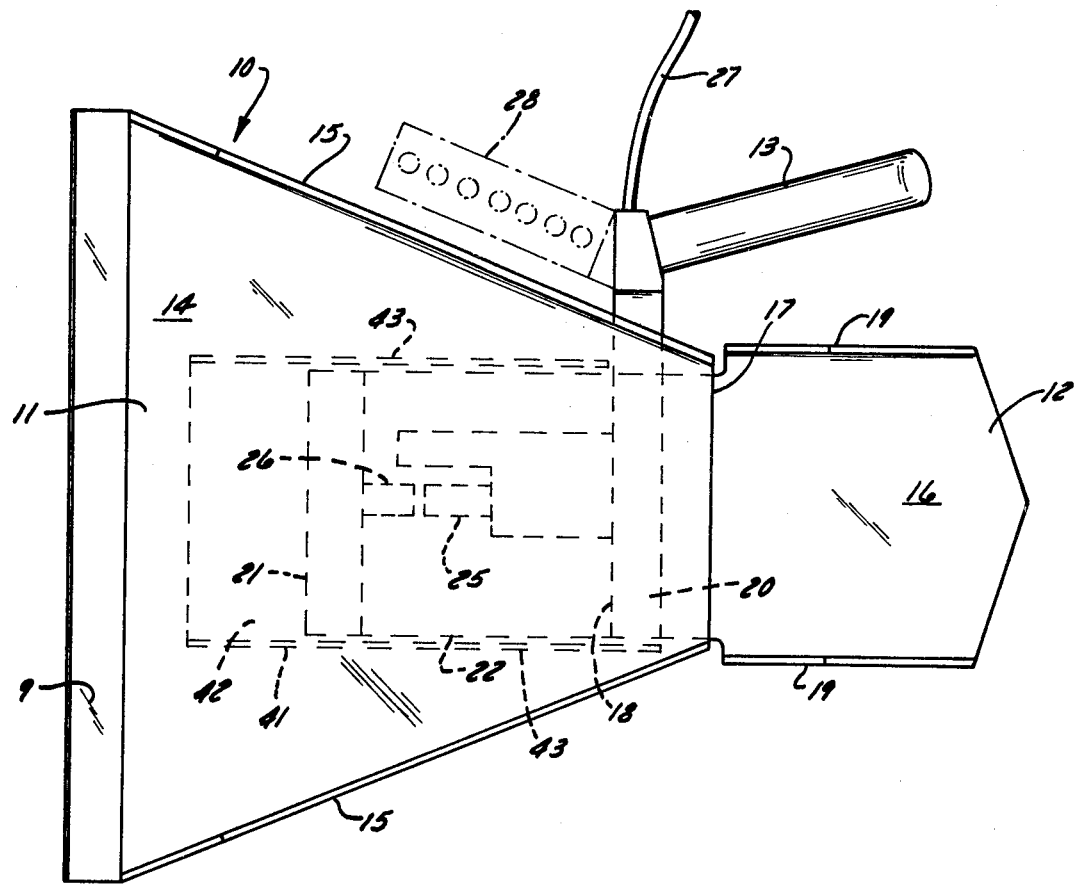
FIG. 1 is a top plan view of the portioning device of the present invention.
Figure 2:
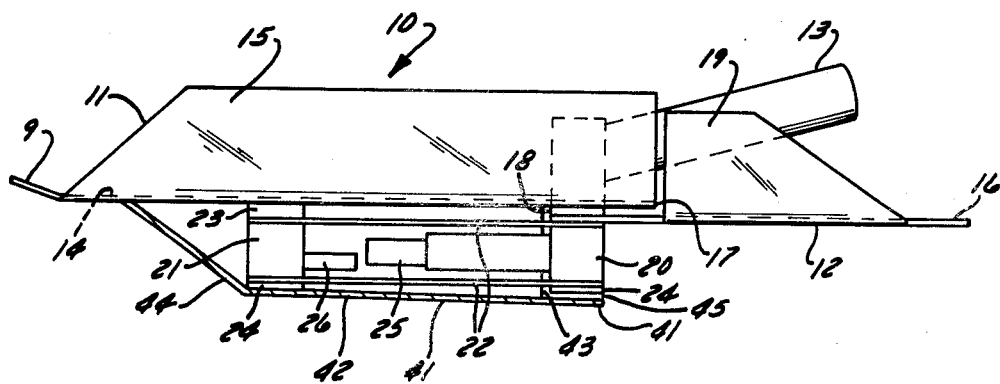
FIG. 2 is a side elevation view of the portioning device shown in FIG. 1.

FIGS. 1 and 2 show a portioning device of the present invention adapted for use in the novel method of portion control to be described hereinafter. The device comprises a hand-held weighing scoop 10 which includes a forward collecting section 11, a rearward discharging section 12, and a handle 13. The collecting section 11 includes a generally flat collecting surface 14 and a pair of side walls 15, all of which converge rearwardly toward the discharging section 12. The forward edge of the collecting surface 14 may be provided with a ramp 9 to facilitate collection, as will be hereinafter described. The discharging section 12 includes a flat discharging surface 16 parallel to but offset slightly below the collecting surface 14. The discharging surface 16 extends forwardly of the rear edge 17 of the collecting surface 14 and terminates in a forward edge 18 such that the surfaces 14 and 16 overlap slightly. The lateral edges 19 of the discharging section 12 extend upwardly perpendicular to the discharging surface 16 and are disposed closely spaced from the rear edges of the side walls 15 of the collecting section 11 to provide essentially extensions thereof to the rear of the scoop 10.

Attached to and depending downwardly from the underside of the discharging surface 16 at the forward edge 18 thereof is a rear mounting block 20. It is of generally square cross section and has a length approximately equal to the width of the discharging surface at its forward edge. A forward mounting block 21, essentially identical to rear block 20, is attached to and depends downwardly from the underside of the collecting surface 14.

The collecting and discharging sections 11 and 12 are interconnected with a pair of leaf springs 22 extending between the mounting blocks 20 and 21 in vertically spaced parallel relation. The rearward edge of the upper leaf spring is clamped between the underside of the discharge surface 16 and the top surface of rear mounting block 20. The forward edge of the upper spring is clamped between the top surface of forward mounting block 21 and a spacer plate 23, the latter in turn is attached directly to the underside of the collecting surface 14. The lower of the two leaf springs 22 is attached by its edges to the undersides of the mounting blocks 20 and 21 with identical clamping plates 24.

In addition to providing connection between the collecting and discharging sections 11 and 12, the leaf springs 22 permit the deflection of the collecting section 11 and relative movement thereof with respect to the discharging section 12 under the weight of articles collected for portioning. This relative movement can be measured and an electrical signal generated proportional to the weight of articles by use of any of a variety of displacement transducers which are well known in the art. In the preferred embodiment shown and described herein, an inductive type displacement transducer is utilized comprising a position sensor 25 affixed to and pointing forwardly from the center of the rear mounting block 20 and a sensor target 26 affixed to and facing rearwardly from the forward mounting block 21 in alignment with the sensor 25. The weight of articles scooped onto the collecting section 11 will cause a downward flexing of the forward ends of the leaf springs 22 and, as a consequence, a downward displacement of the forward mounting block 21 and attached sensor target 26 relative to the position sensor 25 attached to the rear mounting block 20. The relative movement causes a change in the electrical output signal of the sensor proportional to the weight of the articles on the collecting section.

The leaf springs 22 have been found to be particularly well suited for the resilient connection between the collecting and discharging sections 11 and 12. They are of simple construction, yet are quite rugged and capable of withstanding abuse. The thin profile of the springs allows them to be placed beneath the collecting section without detracting from the utility and operation of the scoop. As may be seen in FIG. 1, the sensor 25 and its target 26 are mounted on the longitudinal centerline of the scoop, which is also the centerline of the springs and the point where deflection under load is measured. The deflection of the leaf springs at the midpoint of their connection to the forward mounting block 21 is virtually the same for a given load regardless of its distribution or location on the collecting surface 14. Finally, the leaf springs provide an essentially frictionless movement, the operation of which is unaffected by contaminants such as might adversely affect the operation of a hinged connection or the like.

Power to operate the sensor and other electronic components to be described and the connections to various circuitry are provided via the rear mounting block 20. The handle is attached to one end of the rear mounting block 20 and extends rearwardly therefrom, diverging laterally and upwardly from the lateral edge 19 of the discharging section 12. A power source, the external control circuitry and components, and the remote operator display are all preferably located externally of the scoop 10 and operatively connected to the scoop via a cord 27 attached to the end of the rear mounting block 20 adjacent to the attachment of the handle 13. Alternately, with the use of microelectronic components, the power source and circuitry could be placed within the handle, and the operator display 28, shown in phantom in FIG. 1, could be attached directly to the scoop.

A cover 41 is attached to the underside of the scoop 10 and encloses the mounting block and leaf spring assembly, including the sensor 25 and target 26 mounted within that assembly. The cover includes a cover plate 42 (shown in section in FIG. 2) and a pair of lateral walls 43. The cover plate is demountably attached to the underside of the forward clamping plate 24 and has an upwardly sloping forward portion 44 with its forward edge in contact with the underside of the collecting surface 14. The cover plate 42 extends rearwardly from its point of attachment to the forward clamping plate generally horizontally to the rear edge of the rear clamping plate 24, where it is spaced slightly therefrom, as shown by the gap 45 in FIG. 2. The lateral walls 43 of the cover extend upwardly from the lateral edges of the cover plate 42 and contact the underside of the collecting surface 14. The lateral walls extend rearwardly to substantially enclose, but without touching, the rear mounting block 20. Thus, the spacing of the cover from the rear mounting block and the components attached directly thereto allows the relative deflection of the collecting and discharging sections 11 and 12 without interference. However, the gap 45 is selected to act as a limit stop to prevent excessive deflection as when the ramp 9 of the collecting surface bears in use against the surface from which products are scooped.

In operation, a container such as a bag is placed over the discharging section 12 and held in position by the operator using one or more of the fingers of the hand holding the scoop to hold the bag against the underside of the discharging surface 16. A quantity of products such as french fries is scooped over the ramp 9 and onto the collecting surface 14, with the operator estimating primarily by sight the quantity scooped onto the collecting surface to approximate the standard portion to be discharged into the bag. If the quantity collected is deemed to be approximately equal to the desired standard portion, the scoop is tilted with the ramp 9 disposed upwardly such that the french fries slide downwardly and are funneled by the converging side walls 15 from the collecting surface 14 onto the discharging surface 16 and into the bag. Before tilting the scoop for discharging the products into the bag, the operator may of course adjust the quantity of products on the collecting section 11 by dumping some products therefrom or scooping some additional products into the collecting surface 14.

To the extent just described, the operation of the scoop is in accordance with the method well known in the art. However, the only practical way to check the actual quantity bagged by this prior art method against the standard portion is to remove the filled bag from the scoop and weigh it on a scale. Any adjustment at this point requires the addition or removal of french fries to or from the bag. An adjustment, if required, to attain the weight of the standard portion will provide the operator an exact visual reference of the proper portion and, by utilizing this feedback, the operator can learn to portion more accurately and consistently. Even if the need for an adjustment is indicated by weighing, but none is made, the operator still has a reference based on the scale indication, but must estimate the difference required to reach the proper weight for subsequent portions. In either of the foregoing cases, the visual reference and feedback to the operator are removed in time, location and form from the point at which the initial decision as to portion size is made, namely, when the french fries have been scooped onto the collecting section.

In the method of this invention, by utilizing the intermediate step of weighing the french fries on the scoop, both the visual impression and the actual weight of the quantity of french fries are simultaneously available to the operator at the exact point of decision. If necessary, an immediate adjustment may be made to the quantity of french fries before they are discharged into the bag, at a point where the adjustment can be made most expeditiously. The actual weight of the products on the scoop provides the operator with optimized feedback. The feedback is extremely accurate, is available at the precise time at which adjustment is the easiest to make, and is in the form and location which allow the operator to discriminate the most relevant and useful information available to enhance his learning and the accuracy of future estimates.

It is well known in the science of training personnel that feedback to the trainee of the results of his output is an essential element in the process. Further, in order for feedback to be effective, it should meet certain criteria, namely: (1) the information fed back must be relevant and useful; (2) it must be unique or not redundant; (3) it should be positive as well as negative, so that the trainee sees what to do as well as what not to do; (4) the correct response should be demonstrated or otherwise clearly communicated; (5) the demonstration or display of the correct response should follow closely in time the trainee's own performance; and, (6) the feedback should be specific. It is clear that the apparatus and method of the present invention fulfill each of the foregoing criteria and, for those criteria which are to some extent met by the apparatus and method of the prior art, the present invention improves on each of them.

Certain additional enhancements to the apparatus already described aid in providing the rapid and accurate feedback, and these enhancements, which include eliminating or minimizing the effects of accelerations and tilting, ready adjustment of the standard portion weight, and providing a versatile display of the weight, will now be described.

The accuracy and response of the spring and displacement transducer weighing mechanism also make it very sensitive to accelerative forces induced by operator movement of the scoop. If these accelerative forces are not controlled, the output display of weight would be in a constant state of change, requiring unacceptably slow and tedious operator movement to eliminate the problem. The effects of acceleration can, however, be electronically eliminated or at least minimized.

Figure 3:
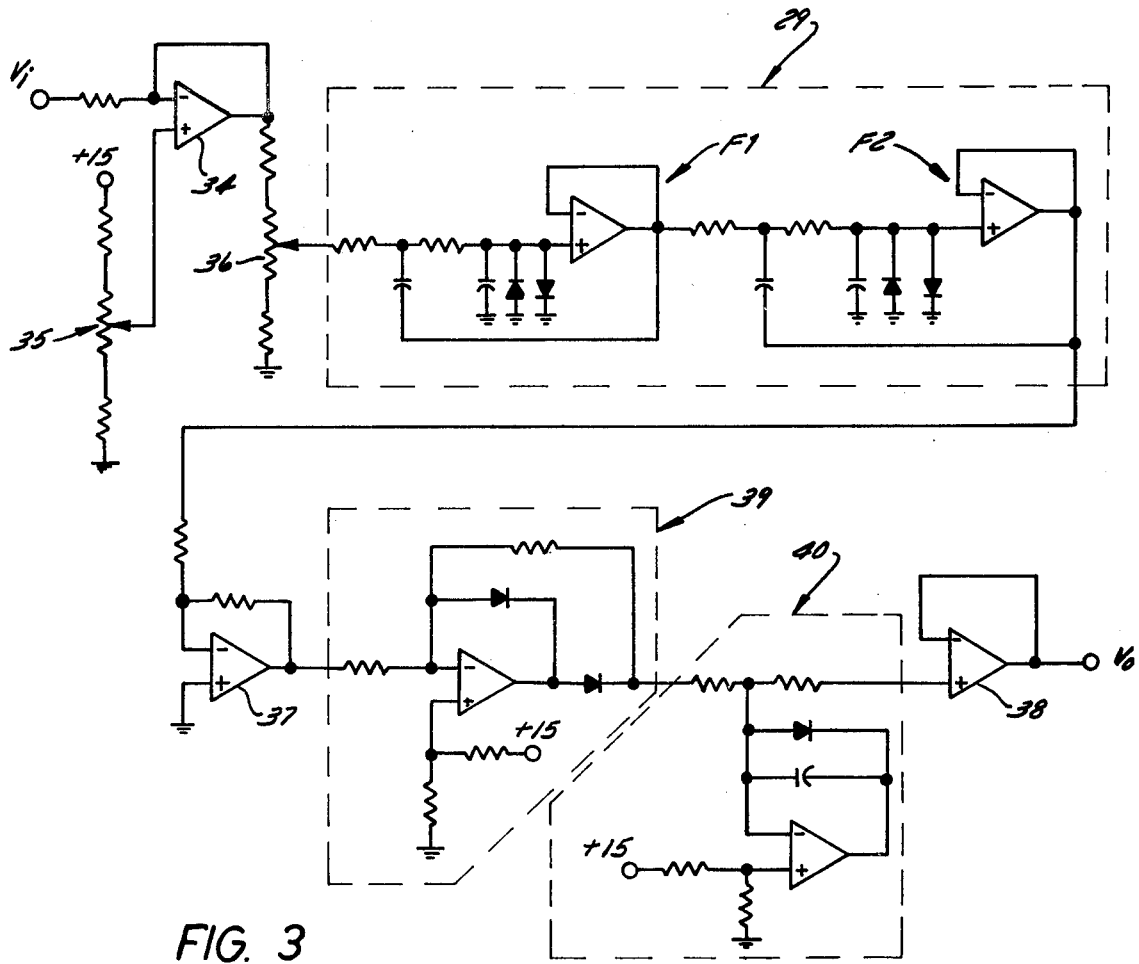
FIG. 3 is a schematic drawing of the circuit used to condition and adjust the electronic weight signal from the device of FIGS. 1 and 2 for display.
Figure 4:
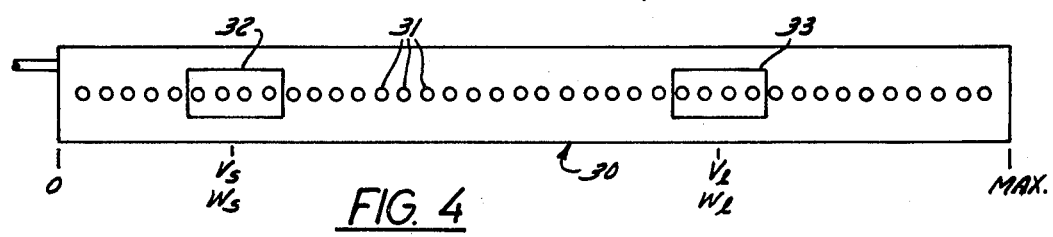
FIG. 4 shows the visual display by which actual measured weight is fed back to the operator.

Referring to FIG. 3, the circuit discloses various components used to modify and condition the input voltage signal $V_i$ from the sensor 25 so that the circuit output voltage $V_o$ can be utilized to operate a linear analog display for the operator, such as the remote LED display 30 shown in FIG. 4. The display shown is adapted to accommodate two standard portions of different weights $W_s$ and $W_l$ which might, for example, be the respective weights of a small and a large bag of french fries. The display 30 comprises a row of LED's 31 which are adapted to be illuminated one at a time in sequence by a circuit output voltage $V_o$ ranging from 0 to a maximum dependent on the number of LED's in the display and the power requirements of each. This is shown schematically in a scale of relative voltages associated with the linear display of FIG. 4. Portions of the display are highlighted, as with bands 32 and 33, to represent the display of the weights of the standard portions $W_s$ and $W_l$, the bands including four LED's each to include an acceptable range of weights above and below the exact standard.

In the preferred embodiment, the signal from the displacement transducer is electronically filtered to eliminate all cyclic output frequencies above a few hertz caused by operator movement, vibrations and the like. The filtered output signal thus comprises essentially only the DC component which quite accurately represents the actual static weight of the french fries or other products on the scoop. In the circuit shown in FIG. 3, the filter 29 comprises a series pair of identical critically damped filters $F_1$ and $F_2$ which together provide a fourth order low pass filtering device. Filtering must be done without excessively slowing the response of the display to a change in weight or introducing overshoot which would result in an unstable display when a weight change is made. The critical damping provided by the filter 29 eliminates overshoot without appreciably affecting response time. The actual result, referring to display 30, is that a change in the weight on the scoop will be displayed quickly with an essentially direct sequential linear excursion of the LED's 31 from the initial weight to the changed weight. The higher order filter provides more attenuation of frequencies above its cutoff point (of a few hertz) for a given speed of response to a change in weight. Cost consideration is the primary limitation on the complexity of the filter that may be used. The fourth order filter 29 provides a satisfactory compromise between cost and performance.

The input voltage signal $V_i$ from the sensor 25 to the circuit is initially adjusted in two respects. First, with the weight of a standard small portion $W_s$ on the scoop, a zeroing adjustment of the input signal $V_i$ to operational amplifier 34 is made via the potentiomer 35 in the bias voltage source to op-amp 34 such that the circuit output $V_o$ will equal $V_s$ and light the display within band 32. Then the voltage gain through op-amp 34 is adjusted with potentiometer 36 so that the addition of the incremental weight $W_l-W_s$, sufficient to bring the weight on the scoop to the standard large portion, will produce an output voltage of $V_l$ and light the display within band 33. This provides true linearity to the display 30 in the range encompassing the two standard portions it is intended to accommodate.

The adjusted signal, filtered at 29 to remove the cyclic components of the signal caused by operator movement and vibration, is further conditioned for operation of the display 30 by increasing the gain through op-amp 37. Op-amp 38 operates as a buffer to add current on demand for the LED display without drawing needed current from the circuit.

Between op-amps 37 and 38, minimum and maximum voltage clamps 39 and 40, respectively, hold the low and high end LED's on and keep them lighted, regardless of actual signal excursions beyond the low or high limits caused, for example, by a load on the scoop greatly in excess of that for which the scoop was intended.

It is also highly desirable to compensate or otherwise eliminate the inaccuracies which arise as result of tilting the scoop relative to the horizontal. Because the displacement transducer used to sense the weight measures the relative displacement of the front (collecting) and rear (discharging) portions of the scoop in a vertical direction, tilting the loaded scoop will result in the measurement of only a component of the actual weight perpendicular to the collecting surface of the scoop. The weight measured and displayed will, therefore, be increasingly less than the actual weight as the angle of tilt from the horizontal increases. At some angle, the difference between measured and actual weight will exceed an acceptable limit and a tilt switch (not shown), set to activate at the angle selected, will shut off power to the display and prompt the operator to make a simple and rapid manual leveling adjustment. Optionally, the tilt switch may be used to activate a device which will boost the signal to the display by an amount sufficient to compensate for the tilt, thereby providing a greater useful range from the horizontal within which the scoop may be accurately operated.

There are a number of alternates to the filter 29 for eliminating or compensating for the effects of accelerations on the output signal from the sensor 25. The undesirable signals generated by accelerative forces can also be electronically clipped in the circuit providing the output signal $V_o$ to power the display. The output signal from the weight sensor with a standard portion on the scoop is first adjusted to zero voltage (as by conditioning the signal $V_i$ to operational amplifier 34 with potentiometer 35). Variations in weight in either direction will generate positive or negative voltage signals which may be electronically clipped to eliminate voltage excursions induced by accelerations outside the selected acceptable range of variation from the standard weight. The effect is to produce a signal which is easier to filter and which results in a more stable display of the weight.

Alternately, an accelerometer may be used to condition the output signal from the weight sensor for the effects of accelerations. Briefly, an accelerometer can be applied to measure directly the forces caused by operator movement, vibrations or the like, and the signals generated by those accelerative forces are added to or subtracted from the sensor output, depending on the direction of the force, resulting in a signal which is representative of the actual static weight. With the use of an accelerometer, tilt compensation is automatic and separate tilt switches are not required. Though very accurate, the increased cost of accelerometers at current prices, as compared to the components required for a filtering or clipping circuit, makes this alternate economically less attractive.

Tests were conducted to compare the portion control provided by the apparatus and method of the present invention with that provided by the prior art scoop and bagging method disclosed in U.S. Pat. No. 3,255,570. In both tests, the operator's goal was to fill in rapid succession 30 bags of french fries with portions as close as possible to 2.5 ounces each. The same operator performed both tests, using identical standard bags having nominal 2.5 ounce capacities, and was allowed a maximum time of 5 seconds to portion and fill each bag.

In the test of the prior art device, the operator was initially shown for a period of 15 seconds, a bag filled with an exact portion of 2.5 ounces of fries. In addition, the operator was shown the weight of every fifth bag of fries filled during the test. The results of the test are shown in Table 1.

TABLE 1

| Bag No. | Weight (oz.) | Bag No. | Weight (oz.) | Bag No. | Weight (oz.) |
|---|---|---|---|---|---|
| 1 | 2.50 | 11 | 2.55 | 21 | 2.75 |
| 2 | 2.75 | 12 | 2.50 | 22 | 2.70 |
| 3 | 2.85 | 13 | 2.50 | 23 | 2.50 |
| 4 | 2.80 | 14 | 2.10 | 24 | 2.60 |
| 5 | 2.25 | 15 | 2.50 | 25 | 2.55 |
| 6 | 2.75 | 16 | 2.10 | 26 | 2.70 |
| 7 | 2.95 | 17 | 2.95 | 27 | 2.60 |
| 8 | 2.75 | 18 | 2.70 | 28 | 2.25 |
| 9 | 2.75 | 19 | 2.60 | 29 | 2.70 |
| 10 | 2.25 | 20 | 3.25 | 30 | 2.75 |

The average weight of the portions from Table 1 is 2.62 ounces with a standard deviation from the 2.5 ounce portion of 0.25 ounce.

In the comparative test using the electronic weighing scoop and portioning method of the present invention, the operator was given no information as to weight or size of the standard 2.5 ounce portion. However, immediate feedback of the actual weight of each portion on the scoop prior to bagging was given to the operator via a remote analog display, as shown in FIG. 4. The results of this test are shown in Table 2.

TABLE 2

| Bag No. | Weight (oz.) | Bag No. | Weight (oz.) | Bag No. | Weight (oz.) |
| --- | --- | --- | --- | --- | --- |
| 1 | 2.60 | 11 | 2.50 | 21 | 2.50 |
| 2 | 2.50 | 12 | 2.55 | 22 | 2.50 |
| 3 | 2.45 | 13 | 2.50 | 23 | 2.70 |
| 4 | 2.45 | 14 | 2.50 | 24 | 2.40 |
| 5 | 2.50 | 15 | 2.50 | 25 | 2.50 |
| 6 | 2.70 | 16 | 2.50 | 26 | 2.45 |
| 7 | 2.70 | 17 | 2.50 | 27 | 2.50 |
| 8 | 2.50 | 18 | 2.60 | 28 | 2.50 |
| 9 | 2.50 | 19 | 2.60 | 29 | 2.55 |
| 10 | 2.60 | 20 | 2.70 | 30 | 2.35 |

The average weight of the portions shown in Table 2 is 2.53 ounces and the standard deviation is 0.09 ounce.

A comparison of the results of the two tests shows substantial improvement in the average weight and a large reduction in the standard deviation in the use of the novel scoop and method described herein as compared to the prior art. The average portion was only slightly higher than the intended weight. It is believed, however, that the reduction in the standard deviation is most significant and important. If, for example, a business operation is required to meet a standard of performance in the portioning of products such that a fixed percentage of all portions must meet or exceed a minimum weight, a reduction in the deviation will allow the use of a lower average portion while still maintaining the fixed percentage at or above the required minimum. The resultant savings by the reduction in over-portioning can, of course, be substantial, particularly in the high volume environment of a fast-food restaurant.

Figure 5:
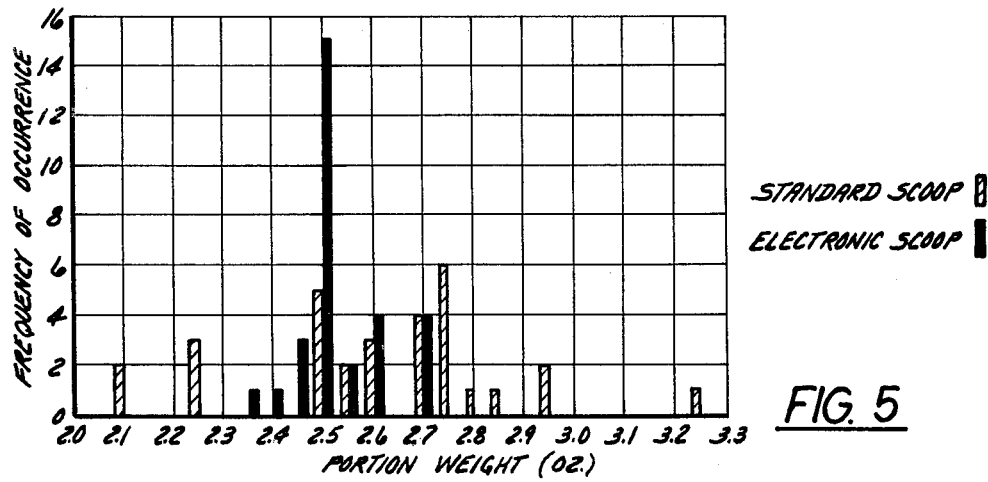
FIG. 5 is a graph of the results of comparative tests of the prior art and the present method and apparatus.

The test results shown in Tables 1 and 2 are graphically displayed in FIG. 5. The graph shows comparative plots of the frequency of occurrence of the weights of products portioned with the prior art scoop and method and the apparatus and method of the present invention. The improvement in accuracy of the average weight and the decrease in the standard deviation are clearly shown.

It is important to note that the method of the present invention adds little or no additional time to the portioning process yet it enhances the accuracy and improves the feedback considerably. The scoop does not have to be immobilized by the operator nor does the operator need to pause to obtain a weight reading. It is even possible to accurately weigh products simultaneously with the collecting and adjusting of the portion on the scoop. Thus, the feedback is provided to the operator in real time so it is immediately useful for final portion determination or for further adjustment.

Although the apparatus of the present invention was described in the preferred embodiment of a front-loading rear-bagging scoop, it is clear that a more conventional front-loading and unloading device utilizing the dynamic weighing apparatus and method is also within the scope of the invention disclosed herein. Further, such a device would be useful in the portioning of both uniform and non-uniform bulk products.

We claim:

1. In the method for providing portion control in the manual bagging of non-uniform bulk products comprising the steps of:
    (a) inserting and maintaining an end of a bagging device within the mouth of a container;
    (b) collecting a quantity of the bulk products on the opposite end of the bagging device;
    (c) adjusting, if required, the quantity collected to visually approximate an established standard portion; and,
    (d) discharging the collected bulk products into the container;

the improvement comprising the additional step of weighing dynamically the bulk products collected on the bagging device and the modified step of adjusting, if required, the quantity collected to approximately equal the established standard portion based on actual measured weight.

2. The method of claim 1 wherein the step of weighing is performed concurrently with the collecting step.

3. In a manually-operated device for portioning and bagging non-uniform bulk products, including a forward section having a generally flat surface for collecting the products, a rearward section in open communication with the forward section for holding a product container and for discharging the products received from the forward section into the container, and a handle attached to the device to facilitate operator control in the movement of the device for collecting and discharging the products, the improvement comprising:
    (a) means for attaching the handle to the discharging section;
    (b) resilient connection means for attaching the collecting section to the discharging section, said connection means adapted to allow relative movement between the sections in a direction generally perpendicular to the collecting surface in response to the weight of products collected thereon;
    (c) transducer means operatively connected to the device for sensing the relative movement and generating an electrical signal proportional to the weight of the products collected; and
    (d) circuit means for receiving the electrical signal and generating an output to the operator indicative of the weight of the products collected.

4. The invention of claim 3 including means operatively connected to the transducer and circuit means for sensing the effect of accelerative forces resulting from operator movement of the device on the weight of the products and for substantially eliminating the effect of such forces on the output to the operator.

5. The invention of claim 4 wherein the means for sensing and eliminating the effect of accelerative forces comprises second circuit means for filtering electrical signals generated by operator movement of the device.

6. The invention of claim 4 wherein the means for sensing and eliminating the effect of accelerative forces comprises second circuit means for clipping the electrical signal and preventing an output to the operator generated by a weight outside selected limits.

7. The invention of claim 4 wherein the means for sensing and eliminating the effect of accelerative forces comprises an accelerometer, the output of which is adapted to modify the electrical signal from the transducer to the circuit means.

8. The invention of claim 4 wherein the means for sensing and eliminating the effect of accelerative forces comprises damping means for slowing the response of the circuit means to changes in the electrical signal caused by accelerative forces.

9. The invention of claim 4 wherein the circuit means includes switching means responsive to tilting of the collecting surface beyond selected limits from the horizontal for shutting off the output to the operator.

10. In a manually operated device for portioning bulk products, including a collecting section having a surface for holding products scooped thereon and a handle attached to the device to facilitate operator control in the movement of the device for collecting and discharging the products, the improvement comprising:

(a) resilient connection means for attaching the handle to the collecting section, said connection means adapted to allow relative movement between the handle and the collecting section in a direction generally perpendicular to the surface of the collecting section in response to the weight of the products thereon;

(b) transducer means operatively connected to the device for sensing the relative movement and generating an electrical signal proportional to the weight of products collected;

(c) circuit means for receiving the electrical signal and generating an output to the operator indicative of the weight of the products collected; and, (d) means operatively connected to the transducer and circuit means for sensing the effect of accelerative forces resulting from extrinsic movement of the device on the weight of the products and for substantially eliminating the effect of such forces on the output to the operator.

* * * * *